United States Patent [19]
Gwaltney et al.

[11] Patent Number: 5,867,198
[45] Date of Patent: Feb. 2, 1999

[54] METHOD FOR ESTIMATION OF TONER USAGE IN DIGITAL XEROGRAPHIC COPIERS AND PRINTERS

[75] Inventors: Mark A. Gwaltney, Fairport; David R. Wyble, Webster, both of N.Y.

[73] Assignee: Xerox Corporation, Stamford, Conn.

[21] Appl. No.: 695,506

[22] Filed: Aug. 12, 1996

[51] Int. Cl.$^6$ .............................. B41J 2/385; G03G 13/04
[52] U.S. Cl. .............................. 347/131; 399/181; 399/27
[58] Field of Search ................................... 347/133, 139, 347/140, 158, 131; 399/27, 28, 30, 61, 181; 430/115, 117, 114, 119; 222/56

[56] References Cited

U.S. PATENT DOCUMENTS

| 4,065,031 | 12/1977 | Wiggins et al. | 222/56 |
| 4,721,978 | 1/1988 | Herley | 399/40 |
| 4,847,659 | 7/1989 | Resch, III | 399/58 |
| 4,908,666 | 3/1990 | Resch, III | 399/61 |
| 5,204,699 | 4/1993 | Birnbaum et al. | 347/131 |
| 5,349,377 | 9/1994 | Gilliland et al. | 347/131 |

*Primary Examiner*—N. Le
*Assistant Examiner*—L. Anderson
*Attorney, Agent, or Firm*—Benjamin B. Sklar; Robert A. Chittum

[57] ABSTRACT

An improved method for estimating toner usage in digital xerographic printers and copiers. The method is characterized by taking into account digital image dot spreading which results in the area of a pixel not being developed fully and some areas outside of the pixel being developed. Thus, the improved method takes into account the departure of a developed image from an ideal shape (i.e. square). To this end, the improved method compensates for departure of a developed image from an ideal shape. In carrying out the method estimated toner usage is based on pixel groupings rather than simple pixel counting.

16 Claims, 5 Drawing Sheets

METHOD FOR ESTIMATION OF TONER USAGE IN DIGITAL XEROGRAPHIC COPIERS AND PRINTERS

BACKGROUND OF THE INVENTION

This invention relates generally to a digital xerographic printers and copiers, and more particularly to an improved method for estimation of toner usage in such devices. The invention also relates to the control of toner additions to a developer housing based on the estimation method.

In a typical electrophotographic printing process, a photoconductive member is charged to a substantially uniform potential so as to sensitize the surface thereof. The charged portion of the photoconductive member is exposed to selectively dissipate the charges thereon in the irradiated areas. This records an electrostatic latent image on the photoconductive member. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

In order to fix or fuse the toner material onto a support member permanently by heat, it is necessary to elevate the temperature of the toner material to a point at which constituents of the toner material coalesce and become tacky. This action causes the toner to flow to some extent onto the fibers or pores of the support members or otherwise upon the surfaces thereof. Thereafter, as the toner material cools, solidification of the toner material occurs causing the toner material to be bonded firmly to the support member.

In digital xerographic printers and copiers, the process control software has available the actual number and distribution of pixels in every image. Pixel-counting can and has been used to estimate the amount of toner used in developing a given image. The estimated value representing the amount of toner consumed is used for controlling the addition of toner to the developer housing.

To maintain print quality over the course of a job, toner concentration must be maintained during the job. This usually means adding toner to the developer housing in a controlled fashion during the entire run. In a digital xerographic engine, the number of pixels printed can be roughly correlated to the amount of toner to be used, and hence the amount of toner which should be dispensed to maintain proper toner concentration. When using simple pixel counting, the area of pixels developed is taken as fully developed, that is, toner mass developed can be calculated according to the following equation:

$$M_t = N_p * A_p * DMA_{max}$$

where:

$M_t$ is the mass of toner developed
$N_p$ is the number of pixels developed
$A_p$ is the area of each pixel
$DMA_{max}$ is the maximum Developed Toner Mass Area which can be developed.

Due to the spreading of a digital image, the area of the pixel is not developed fully and some areas outside of the pixel are developed. Neither of these phenomena are accounted for in the forgoing equation.

The error in the equation occurs because it fails to account for the departure of the developed image from the ideal shape (i.e. square or rectangular). This error is greatest when developing isolated pixels, and decreases as the size of a pixel cluster increases. The error can be graphically represented by the deviation from the ideal. It is noted that the simulation data used and disclosed hereinafter reflects one particular xerographic system and setup. For this system, small dots are underestimated but for other systems (e.g. line spreading systems or systems with edge enhancement) the small dot estimation may be different. In any case, the largest errors are for isolated pixels and small clusters of pixels.

Following is a discussion of prior art, incorporated herein by reference, which may bear on the patentability of the present invention. In addition to possibly having some relevance to the question of patentability, these references, together with the detailed description to follow, should provide a better understanding and appreciation of the present invention.

U.S. Pat. No. 3,409,901 discloses a xerographic system in which a toner concentration control system feeds toner to the developing mechanism in proportion to the area and density of the print. A cathode-ray tube (CRT) is used to expose a photoconductive member, and the signal which drives the CRT is also provided to a toner feed signal means where the signal is summed . When the signal exceeds a predetermined level an output signal is generated to cause toner to be dispensed into the developer mechanism .

U.S. Pat. No. 4,065,031 describes a device for regulating the dispensing of toner particles to a developer mix . During the operation of an electrostatographic printing machine a sensing mechanism, including a photosensor for determining the density of toner developed on a photoreceptor, outputs signals indicative of the toner concentration . The signals are summed and processed to determine if additional toner should be added to the developer mix.

U.S. Pat. No. 4,721,978, the relevant portions of which are hereby incorporated by reference, discloses an apparatus for controlling the concentration of toner particles used to form a highlight color document . Three signals are generated and processed to regulate the dispense rate of toner particles used to form the highlight color portion of the output document . The first signal is an indication of the percentage of the document area arranged to have color highlighted portions thereon . The second signal corresponds to the rate of toner particle usage per document, as determined by a central processing unit, and the third signal indicates the number of copies to be produced . To determine the amount of highlight color toner used, the three signals are multiplied, the product of the signals being used as a control signal which corresponds to the required dispense rate.

U.S. Pat. No. 4,847,659 describes an electrostatographic machine which replenishes toner in a developer mix in response to a toner depletion signal which represents the toner usage rate . The toner depletion signal is determined from the number of character print signals applied to a print head, or in other words, the number of pixels to be toned. The depletion signal is used in conjunction with a second signal, which represents a proportional toning contrast, such that the constant of proportionality between the toner depletion signal and a toner replenishment signal is adjusted according to the second.

U.S. Pat. No. 4,908,666 teaches a toner replenishment control structure which operates in one of two control states to control contrast characteristics when using developers having two developer materials. The first developer material exhibits contrast characteristics which vary with concentration and the second developer material does not exhibit contrast variation due to concentration variance. The system has a first control state for replenishing the first developer material as a function of a concentration signal and a second control state for replenishing the second developer material as a function of a contrast signal.

Xerox Disclosure Journal, Vol. 6, No. 6 (Nov./Dec. 1981) describes a toner dispensing control system that relies upon an intensity signal, representing the intensity of light reflected from the surface of an original document, and a developed density signal to produce an error signal. Subsequently a combination signal is produced as a function of the error signal, in accordance with a predetermined algorithm, to control the dispensing of toner to the developer material.

U.S. Pat. 5,204,699 describes a method to estimate toner use by summing the intensities of the pixels being imaged. This sum of pixels is then related to an amount of toner to determine the amount to dispense. This allows for the pixel counting routine to count intensity information rather than just binary pixel summing.

U.S. Pat. No. 5,349,377 discloses an improved system for more accurately estimating consumption of toner imaging material in a digital xerographic printer in relation to a count of the digital pixels generating the various images being printed, where the frequency rates of the switching between print and non-print pixels are analyzed to provide weighting factors corresponding to different types of images being printed which affect the consumption of imaging material by the printer, and the pixel counts are weighted by these weighting factors to provide an imaging material consumption calculation based on image types as well as image pixel counts. The pixel count weighting factor is automatically substantially increased for the higher print/nonprint rates, or pixel on/off frequencies, and higher toner consumption by fringe field development, corresponding to halftone images in comparison to solid area images. The pixel count weighting factor is intermediately increased for intermediate imaging frequencies corresponding to normal line text.

BRIEF SUMMARY OF THE INVENTION

According to the present invention, an algorithm or method which relates pixel distribution to actual DMA is employed. The output of this algorithm is total pixels, which represent the equivalent number of fully developed pixels developed on one scanline. The value can be used directly in the aforementioned equation. Critical to this method is the conversion of a particular dot size to actual DMA. This is done by scaling the dot size by an empirically-derived estimation error. The scaled dotsize is the equivalent number of fully developed pixels which are assumed to be developed at $DMA_{max}$.

DETAILED DESCRIPTION OF THE
PREFERRED EMBODIMENT OF THE
INVENTION

Figure 5:
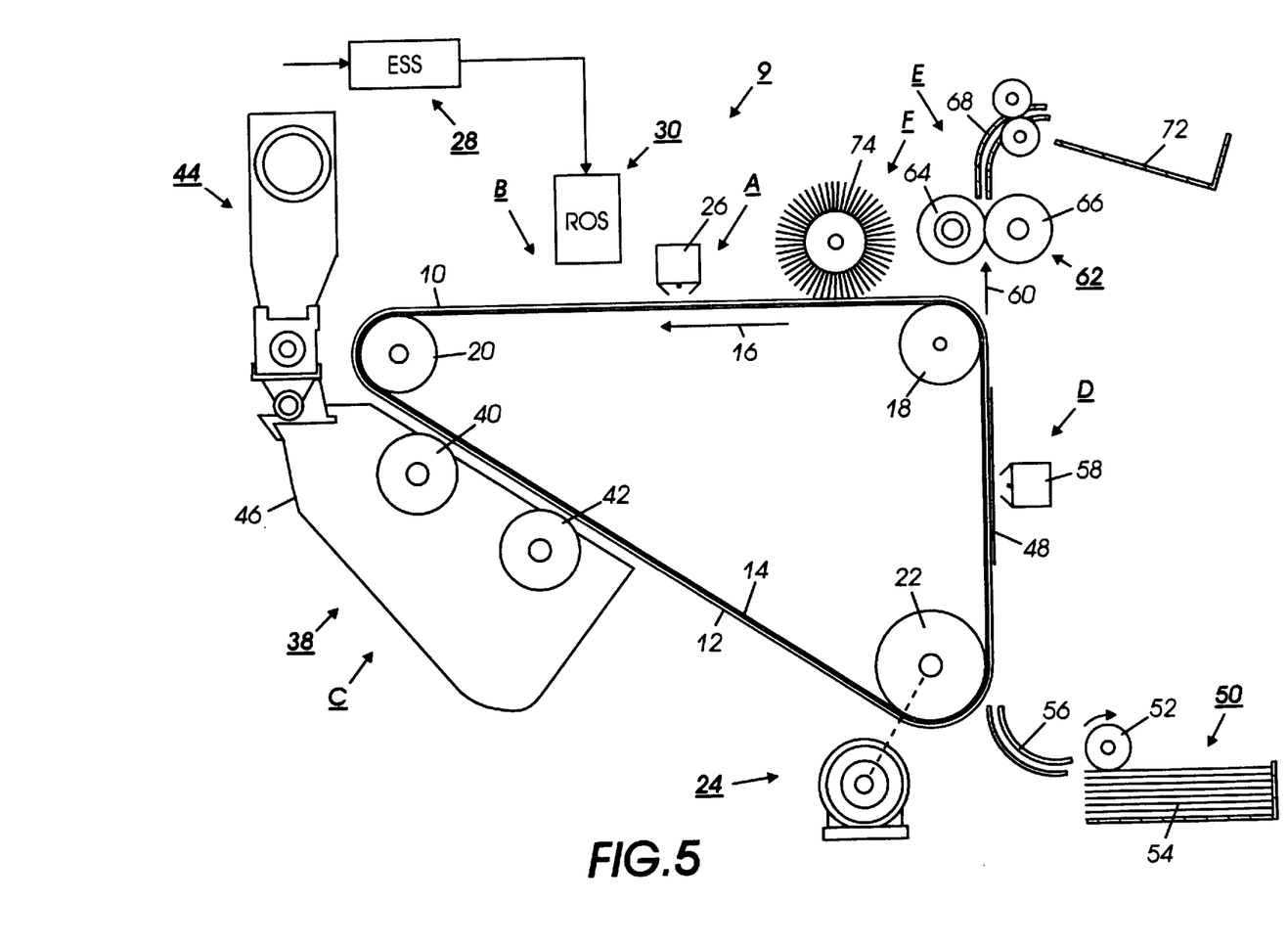
FIG. 5 is a schematic representation of a monochrome electrophotographic printing machine in which the present invention may be utilized.

For a general understanding of the operation of the developer usage measurement apparatus of the present invention, reference is made to the drawings. In the drawings, like reference numerals have been used throughout to designate identical elements. FIG. 5 schematically illustrates an electrophotographic printing machine 9 which generally employs a belt 10 having a photoconductive surface 12 deposited on a conductive ground layer 14. Preferably, photoconductive surface 12 is made from a photoresponsive material, for example, one comprising a charge generation layer and a transport layer. Conductive layer 14 is made preferably from a thin metal layer or metalized polymer film which is electrically grounded. Belt 10 moves in the direction of arrow 16 to advance successive portions of photoconductive surface 12 sequentially through the various processing stations disposed about the path of movement thereof. Belt 10 is entrained about stripping roller 18, tensioning roller 20 and drive roller 22. Drive roller 22 is mounted rotatably in engagement with belt 10. Motor 24 rotates roller 22 to advance belt 10 in the direction of arrow 16. Roller 22 is coupled to motor 24 by suitable means, such as a drive belt, not shown. Belt 10 is maintained in tension by a pair of springs (not shown) resiliently urging tensioning roller 20 against belt 10 with the desired spring force. Stripping roller 18 and tensioning roller 20 are mounted to rotate freely.

Initially, a portion of belt 10 passes through charging station A. At charging station A, a corona generating device, indicated generally by the reference numeral 26 charges the photoconductive surface, 12, to a relatively high, substantially uniform potential. After photoconductive surface 12 of belt 10 is charged, the charged portion thereof is advanced through exposure station B.

At an exposure station, B, an Electronic Sub-System (ESS), indicated generally by reference numeral 28, receives image signals representing the desired output image and processes these signals to convert them to a continuous tone or greyscale rendition of the image which is transmitted to a modulated output generator, for example a Raster Output Scanner (ROS), indicated generally by reference numeral 30. Preferably, ESS 28 is a self-contained, dedicated minicomputer. The image signals transmitted to ESS 28 may originate from a computer, thereby enabling the electrophotographic printing machine to serve as a remotely located printer for one or more computers. Alternatively, the printer may serve as a dedicated printer for a high-speed computer. The signals from ESS 28, corresponding to the continuous tone image desired to be reproduced by the printing machine, are transmitted to ROS 30. ROS 30 includes a laser with rotating polygon mirror blocks. The ROS illuminates the charged portion of photoconductive belt 10 at a resolution of about 300 pixels per inch. The ROS discharges the photoconductive belt to record an electrostatic latent image thereon corresponding to the continuous tone image received from ESS 28. As an alternative, ROS 30 may employ a linear array of light-emitting diodes (LEDs) arranged to illuminate the charged portion of photoconductive belt 10 on a raster-by-raster basis.

Similarly, ROS 30 might also comprise an ion projection device suitable for modulating the ionographic output of the device in accordance with the level of the continuous tone image signals provided from ESS 28. In such an embodiment, belt 10 may be any flexible electrostatically insulating material as photoresponsiveness would not be required to produce the electrostatic latent image. It is important to note that the exposure element utilized in ROS 30 is not critical, rather it is the requirement that the exposure device used be responsive to the multiple level (greyscale) image intensity signals in such a manner so as to cause a variation in the charge potential deposited on the surface of belt 10 which corresponds to the image intensity signal.

In another embodiment, ESS 28 may be connected to a Raster Input Scanner (RIS). The RIS has an original document positioned thereat. The RIS has document illumination lamps, optics, a scanning drive, and photosensing elements, such as an array of Charge Coupled Devices (CCD). The RIS captures the entire image from the original document and converts it to a series of raster scanlines which are transmitted as electrical signals to ESS 28. ESS 28 processes the signals received from the RIS and converts them to greyscale image intensity signals which are then transmitted to ROS 30. ROS 30 exposes the charged portion of the photoconductive belt to record an electrostatic latent image thereon corresponding to the greyscale image signals received from ESS 28.

After the electrostatic latent image has been recorded on photoconductive surface 12, belt 10 advances the latent image to a development station, C, where toner, in the form of dry marking particles, is electrostatically attracted to the latent image using commonly known techniques. At development station C, a magnetic brush development system, indicated by reference numeral 38, advances developer material into contact with the latent image. Magnetic brush development system 38 includes two magnetic brush developer rollers 40 and 42. Rollers 40 and 42 advance developer material into contact with the latent image. To this end the developer rollers form a brush of carrier granules and toner particles extending outwardly therefrom. The latent image attracts toner particles from the carrier granules forming a toner powder image on the photoconductive surface 12. As successive electrostatic latent images are developed, toner particles are depleted from the developer material. A toner particle dispenser, indicated generally by the reference numeral 44, dispenses toner particles into developer housing 46 of developer unit 38.

With continued reference to FIG. 5, after the electrostatic latent image is developed, the toner powder image present on belt 10 advances to transfer station D. An image substrate 48 is advanced to the transfer station D by a feeding apparatus, 50. Preferably, feeding apparatus 50 includes a feed roll 52 contacting the uppermost substrate of stack 54. Feed roll 52 rotates to advance the uppermost substrate from stack 54 into chute 56. Chute 56 directs the advancing substrate into contact with photoconductive surface 12 of belt 10 in a timed sequence so that the toner powder image formed thereon contacts the advancing substrate at transfer station D. Transfer station D includes a corona generating device 58 which sprays ions onto the back side of sheet 48. This attracts the toner powder image from photoconductive surface 12 to sheet 48. After transfer, sheet 48 continues to move in the direction of arrow 60 onto a conveyor (not shown) which advances sheet 48 to fusing station E. A detack corona emitting device, not shown, may be employed when required.

The fusing station, E, includes a fuser assembly, indicated generally by the reference numeral 62, which permanently affixes the transferred powder image to sheet 48. Fuser assembly 62 includes a heated fuser roller 64 and a pressure roller 66. Sheet 48 passes between fuser roller 64 and pressure roller 66 with the toner powder image contacting fuser roller 64. In this manner, the toner powder image is permanently affixed to substrate 48. After fusing, substrate 48 advances through chute 68 to catch tray 72 for subsequent removal from the printing machine by the operator. After the imaged substrate is separated from photoconductive surface 12 of belt 10, the residual toner particles adhering to photoconductive surface 12 are removed therefrom at cleaning station F. Cleaning station F includes a rotatably mounted fibrous brush 74 in contact with photoconductive surface 12. The particles are cleaned from photoconductive surface 12 by the rotation of brush 74 in contact therewith. Subsequent to cleaning, a discharge lamp (not shown) floods photoconductive surface 12 with light to dissipate any residual electrostatic charge remaining thereon prior to the charging thereof for the next successive imaging cycle.

It is believed that the foregoing description is sufficient for purposes of the present application to illustrate the general operation of an electrophotographic printing machine in which the present invention may be utilized. Moreover, while the present invention is described in the embodiment of a single color printing system, there is no intent to limit it to such an embodiment. On the contrary, the present invention is intended for use in multi-color printing systems as well.

To maintain print quality over the course of a printing job, toner concentration in the development system 38 must be maintained during the job. This usually means adding toner to the developer housing in a controlled fashion during the entire run. In a digital xerographic engine, the number of pixels printed can be roughly correlated to the amount of toner to be used, and hence the amount of toner which should be dispensed to maintain proper toner concentration. When using simple pixel counting, the area of pixels developed is taken as fully developed, that is, toner mass developed can be calculated as:

$$M_t = N_p * A_p * DMA_{max}$$

where:
  $M_t$ is the mass of toner developed.
  $N_p$ is the number of pixels developed.
  $A_p$ is the area of each pixel
  $DMA_{max}$ is the maximum Developed Toner Mass Area which can be developed.

Figure 1:
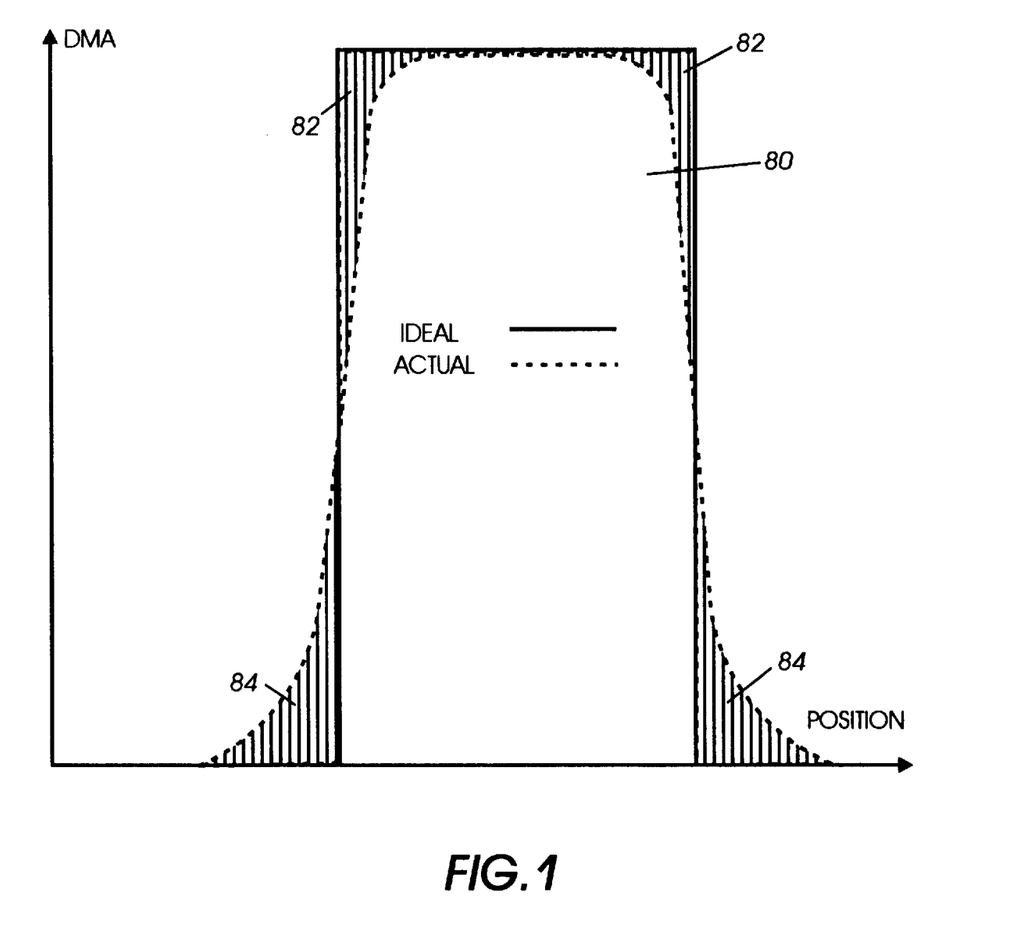
FIG. 1 depicts a developed dot profile using simple pixel counting estimating.

As shown in FIG. 1, because of spreading of the digital image, the area of a pixel 80 as indicated by areas 82 is not developed fully and some areas 84 outside of the pixel are developed. Neither of these phenomena are accounted for in the forgoing equation.

Figure 2:
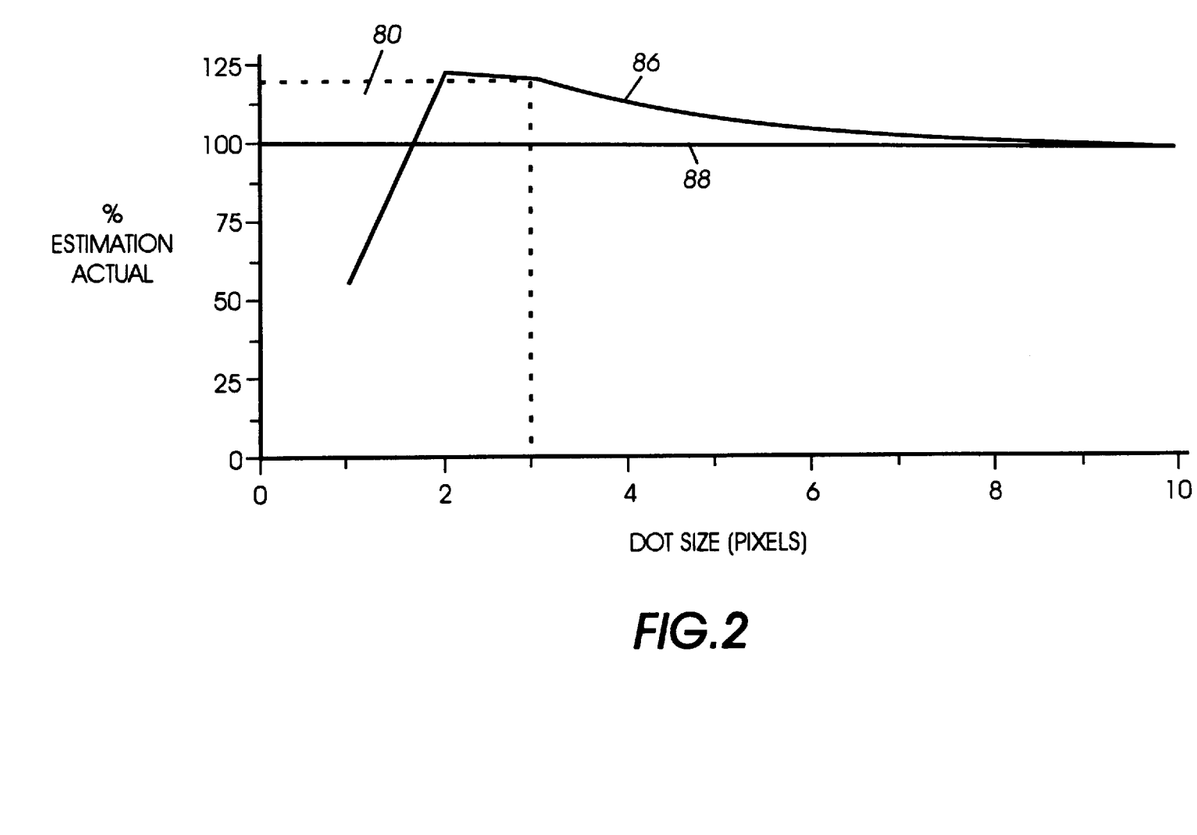
FIG. 2 is a plot of percent estimation error vs. Dot size in pixels.

The error in the equation occurs because it fails to account for the departure of the developed image from the ideal shape (i.e. square). As shown in FIG. 2, this error as depicted by curve 86 is greatest when developing isolated pixels, and decreases as the size of a pixel cluster increases. The error here is indicated by the deviation from a straight line 88 at 100%. As can be seen from FIG. 2, for a single pixel the estimation error is in the order of 50%, underestimated and for three pixels is about 120%, overestimated.

It is noted that the simulation data used for FIG. 2 reflects one particular xerographic system and setup. For this system, small dots are underestimated but for other systems (e.g. line spreading systems or systems with edge enhancement) the small dot estimation may be different. In any case, the largest errors are for isolated pixels and small clusters of pixels.

Figure 3:
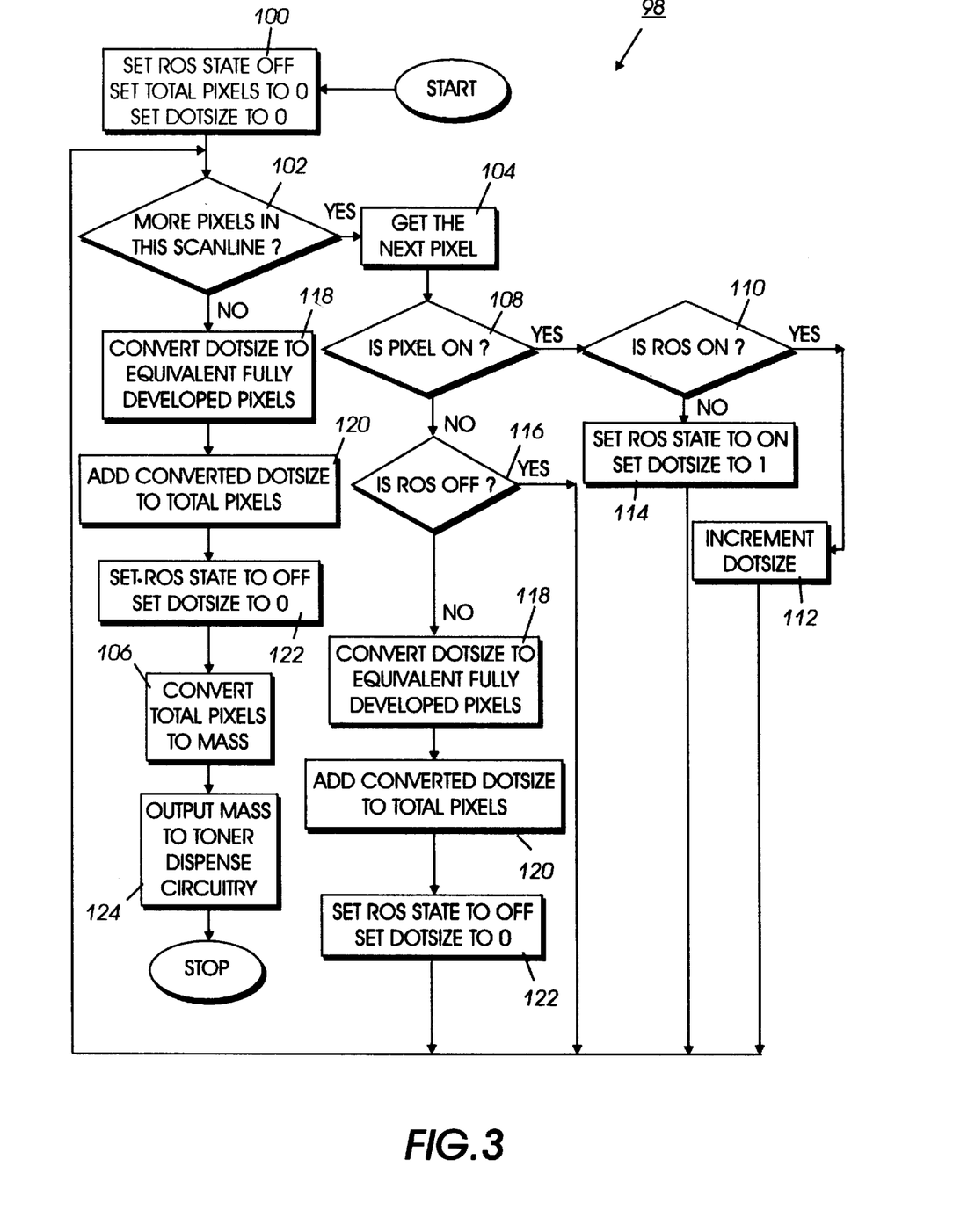
FIG. 3 is a flow chart of a pixel counting algorithm according to the present invention.

According to the present invention, an algorithm which relates pixel distribution to actual DMA is employed. As illustrated in FIG. 3, the printer 9 comprises a controller 90 including the aforementioned algorithm which is represented by a flow chart 98. The controller forms part of the ESS 28. The output of this algorithm is electrical signals corresponding to total pixels, which represent the equivalent number of fully developed pixels developed on one scanline. The output signals which are utilized to actuate the toner dispenser 44 for effecting the addition of toner to the development system 38. This value can be used directly in the equation $M_t = N_p * A_p * DMA_{max}$. Critical to this method is the conversion of a particular dot size to actual DMA. This is done by scaling the dot size by the empirically-derived estimation error in FIG. 2. The scaled dotsize is equivalent number of fully developed pixels which are assumed to be developed at $DMA_{max}$.

By way of example, for a cluster found of width 3, the total DMA estimated should be 3*120% (see FIG. 2) or about 3.6 fully-developed pixels. Using simple pixel counting where each pixel is equated to one full-developed pixel would result in an estimation error of 0.6 (i.e. 3.6–3.0) fully-developed pixels.

FIG. 3 shows the flow chart 98 of the inventive process which starts at the start of each scan line (SOS) and stops at the end of each scan line (EOS). At step 100 of the process, the state of ROS 30 is set to off and pixel and dotsize counters are set to zero. The controls for the ROS and the counters may comprise part of the ESS and may be easily effected using well known control techniques. Thus, they form no part of the present invention.

At the next step of the process as indicated by reference character 102, a decision is made as to whether or not there are more pixels in the scanline being analyzed. If there are more pixels in this scanline the next pixel is retrieved according to a step in the process indicated by reference character 104. If no more pixels are present in this scanline a step in the process represented by reference character 106 is executed.

At this point for the purpose of discussion, it will be assumed that there are more pixels in the scanline. Thus, according to the next step in the process, designated by reference character 108, a determination is made as to whether the pixel is on or off. When the pixel is on and the state of the ROS is on as indicated in step 110, a dotsize counter is incremented according to step 112 followed by the execution of decision making step 102. On the other hand, if the ROS is in its off state, the ROS is set to its on state and the dotsize is set to 1 at step 114 followed by the execution of decision making step 102.

Referring again to the decision making step 108, if the pixel is off a determination as to whether the ROS is in the on or off state is determined at step 116. For the off state of the ROS, at step 116, step 102 is repeated. When it is determined at step 116 that the ROS is on then the dotsize is converted to equivalent fully developed pixels at step 118. The forgoing conversion is effected using a lookup table in Non Volatile Memory (NVM) containing the values plotted in FIG. 2. The converted dotsize is added to the total pixel count, step 120, followed by the setting of the ROS to the off state and the setting of the dotsize to zero, step 122. Step 102 is then repeated.

It will now be assumed that there are no more pixels in the scanline, step 102. In this situation, the total pixels are converted to mass according to the formula $M_t = N_p * A_p * DMA_{max}$, step 106. As will be appreciated, the value corresponding to the total pixels which were converted to mass in step 106 are utilized in the equation. The determined mass is then outputted to circuitry for the toner dispenser 44, step 124. The process is repeated with each new scanline.

Figure 4:
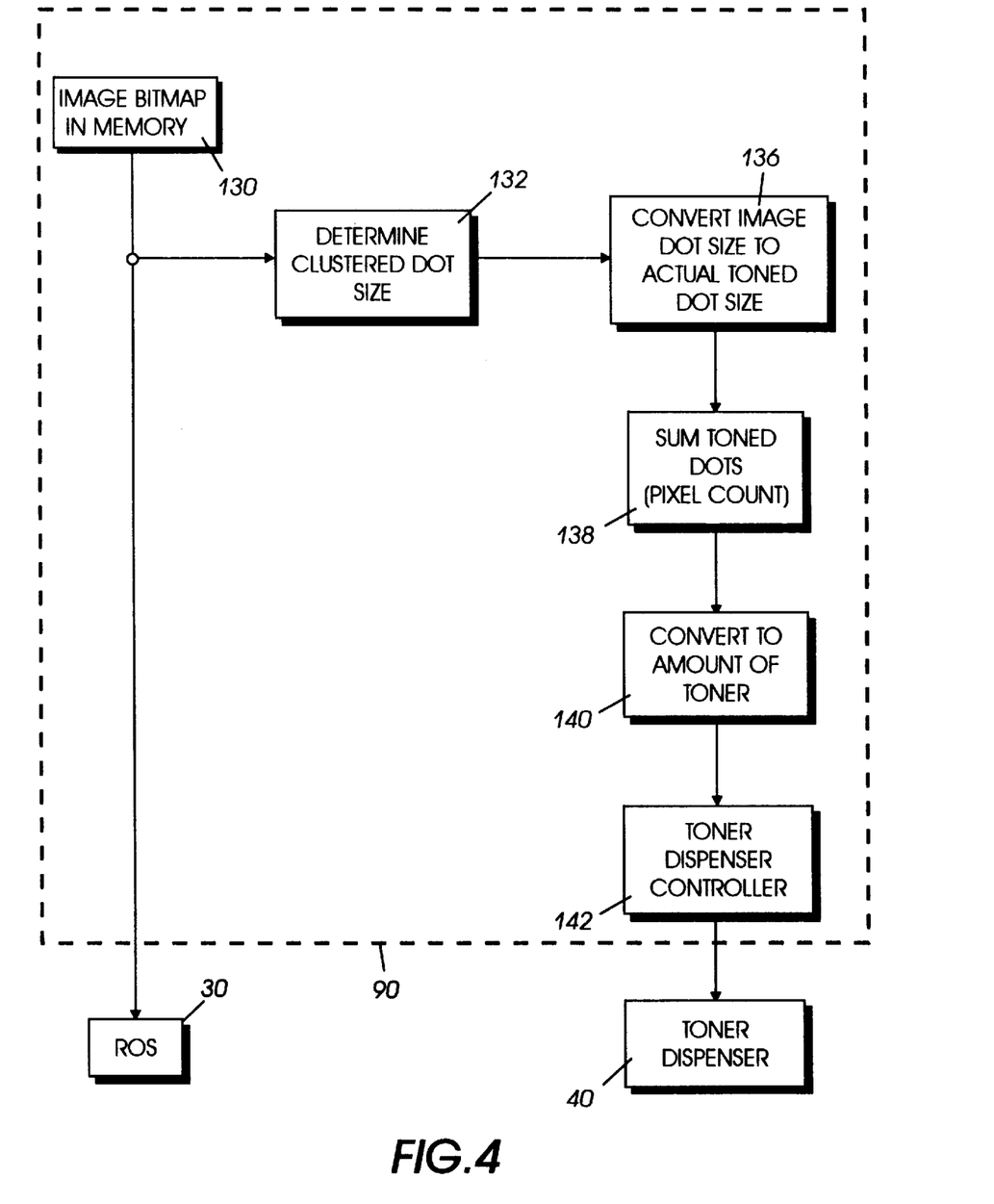
FIG. 4 is a flow diagram of controller elements for generating electrical signals for effecting toner dispensing.

As shown in FIG. 4, the controller 90 comprises an image bitmap memory device 130 which serves to store the image bitmap used to drive the ROS 30. The memory device is operatively connected to Nonvolatile Memory 132 containing a lookup table representing the information contained in FIG. 2. Here the clustered dot size is determined according to the algorithm illustrated in FIG. 3. The clustered dot size is inputted into a linear equation solver 136 for calculating the toned dot size for a specific scanline. The actual toned dot size is then stored in memory 138 to be used for converting, device 140 the amount of toner to generate appropriate signals for operating a toner dispenser controller 142 which is operatively connected to the toner dispenser 44.

We claim:

1. A method of estimating the mass of toner deposited on electrostatic latent images, said method including the steps of:

determining a number and distribution of image pixels in each of a plurality of clusters of image pixels on a cluster by cluster basis, the plurality of clusters of image pixels forming said latent image;

generating signals representing said number and distribution;

using said signals representing said number and distribution of image pixels for determining a number of equivalent fully developed pixels; and converting said number of equivalent fully developed image pixels to the toner mass and generating signals representative of the mass of toner deposited on said latent images.

2. The method according to claim 1 wherein said step of determining includes determining a number of single image pixels and determining a number of pixels in each cluster.

3. The method according to claim 2 wherein said step of determining said number of fully developed image pixels includes comparing said single pixels and said pixel clusters to an empirically-derived estimation error curve.

4. The method according to claim 3 wherein said empirically-derived estimation error curve is stored in computer memory.

5. A method of replenishing toner in a developer housing, said method including the steps of:

determining a number and distribution of image pixels in each of a plurality of clusters of image pixels on a cluster by cluster basis, the plurality of clusters of image pixels forming an electrostatic latent image developed by toner from said developer housing;

generating signals representing said number and distribution;

using said signal representing said number and distribution of image pixels for determining a number of equivalent fully developed pixels;

converting said number of equivalent fully developed pixels to toner mass;

generating signals representative the of mass of toner; and using said signals representing the toner mass for controlling the amount of toner added to said developer housing.

6. The method according to claim 5 wherein said step of determining includes determining a number of single image pixels and determining a number of pixels in each cluster.

7. The method according to claim 6 wherein said step of determining said number of fully developed image pixels includes comparing said single pixels and said pixel clusters to an empirically-derived estimation error curve.

8. The method according to claim 7 wherein said empirically-derived estimation error curve is stored in computer memory.

9. Apparatus for estimating the mass of toner deposited on electrostatic latent images, said apparatus comprising:

means for determining a number and distribution of image pixels in each of a plurality of clusters of image pixels on a cluster by cluster basis, the plurality of clusters of image pixels forming said latent image;

means for generating signals representing said number and distribution;

means for determining a number of equivalent fully developed pixels using said signals representing said number and distribution of image pixels; and means for converting said number of equivalent fully developed image pixels to the toner mass and for generating signals representative of the mass of toner deposited on said latent image.

10. Apparatus according to claim 9 wherein said means for determining a number of equivalent fully developed pixels comprises means for determining a number of single image pixels and determining a number of pixels in each cluster.

11. Apparatus according to claim 10 wherein said means for determining said number of fully developed image pixels comprises means for comparing said single pixels and said pixel clusters to an empirically-derived estimation error curve.

12. Apparatus according to claim 11 including memory means for storing said empirically-derived estimation error curve.

13. Apparatus for replenishing toner in a developer housing, said apparatus comprising;

means for determining a number and distribution of image pixels in each of a plurality of clusters of images pixels on a cluster by cluster basis, the plurality of clusters of image pixels forming an electrostatic latent image developed by toner from said developer housing;

means for generating signals representing said number and distribution;

means for determining a number of equivalent fully developed pixels using said signals representing said number and distribution of image pixels; and means for converting said number of equivalent fully developed image pixels to toner mass and for generating signals representative of the toner mass; and means for controlling toner additions to said developer housing in response to said signals representative of the mass of toner deposit or said latent image.

14. Apparatus according to claim 13 wherein said means for determining a number of equivalent fully developed pixels comprises means for determining a number of single image pixels and determining a number of pixels in each cluster.

15. Apparatus according to claim 14 wherein said means for determining said number of fully developed image pixels comprises means for comparing said single pixels and said pixel clusters to an empirically-derived estimation error curve.

16. Apparatus according to claim 15 including memory means for storing said empirically-derived estimation error curve.

* * * * *